Nov. 17, 1964   S. PETERSON ETAL   3,157,156
AUTOMATED POULTRY EJECTING EGG NEST
Filed March 12, 1963   2 Sheets-Sheet 1
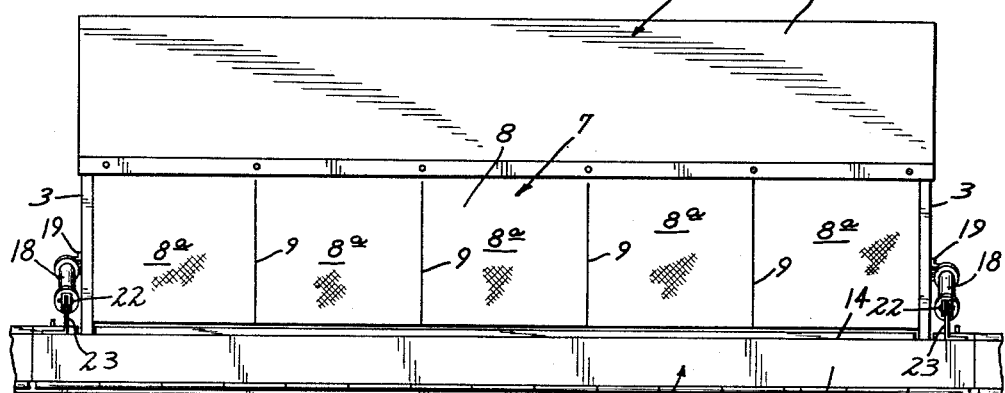
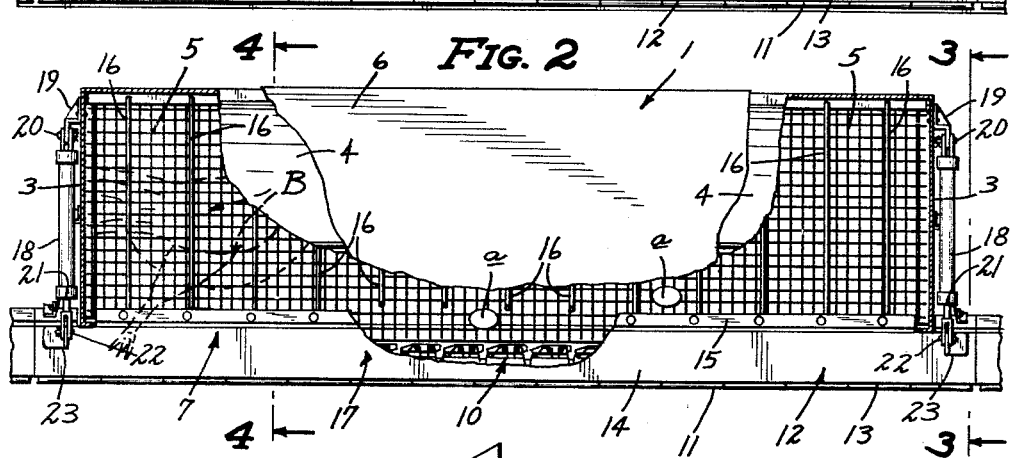
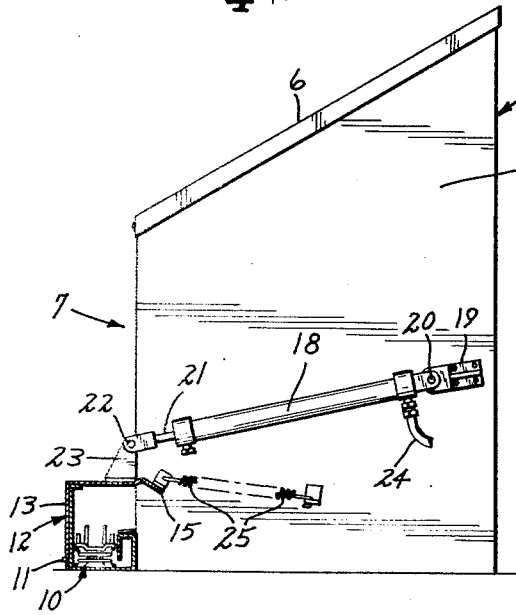
INVENTORS.
SEYMOUR PETERSON
JOHN W. GRANATH
BY
Merchant, Merchant & Gould
ATTORNEYS

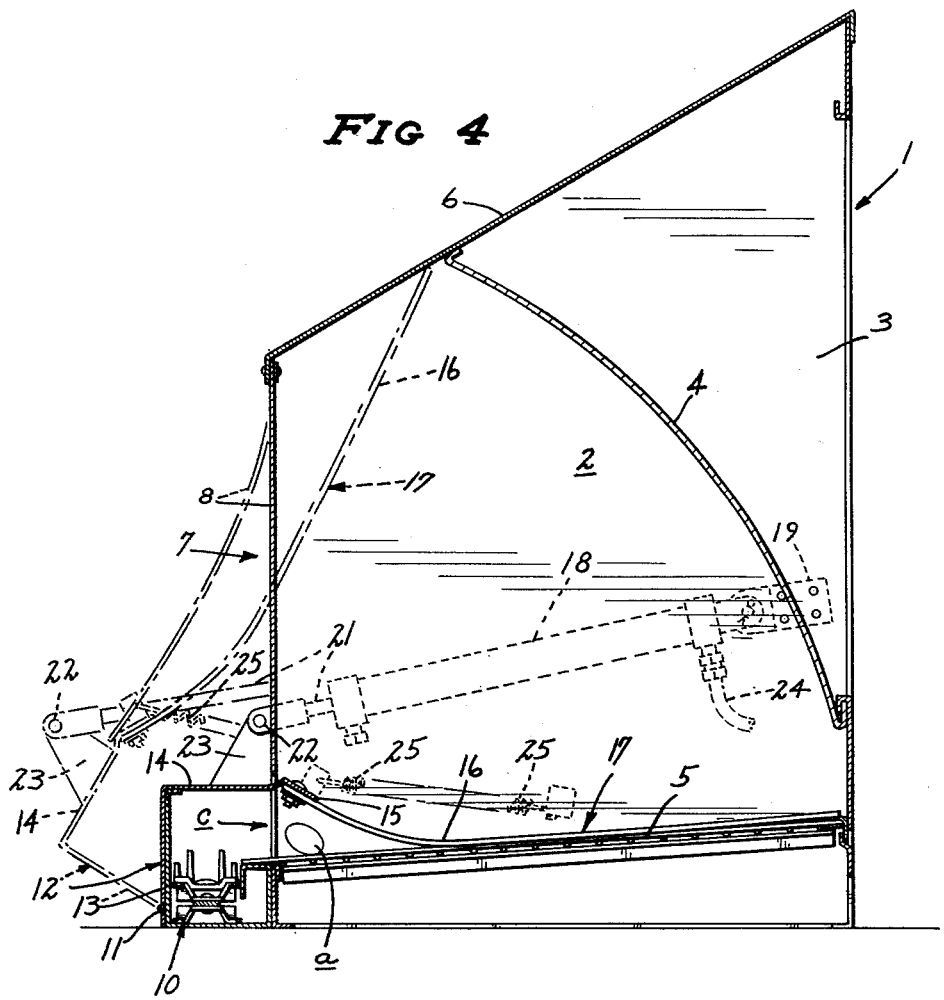

United States Patent Office 3,157,156
Patented Nov. 17, 1964

3,157,156
AUTOMATED POULTRY EJECTING EGG NEST
Seymour Peterson and John W. Granath, Dassel, Minn., assignors to Storm Industries, Inc., Dassel, Minn., a corporation of Minnesota
Filed Mar. 12, 1963, Ser. No. 264,655
5 Claims. (Cl. 119—45)

This invention relates to poultry nesting devices and more particularly to nests of the type wherein the hens are periodically swept from the nests and are thereafter barred from reentering same for a predetermined period of time so as to maintain the nest completely free from droppings during said period.

The primary object of our invention is the provision of a nest of the type above described which is provided with a novel sweep-barrier element, which is independent of the walls of the nest and which, without damage to the eggs, will remove live chickens therefrom, but also will remove therefrom any chickens which happen to die while occupying the nest.

Further envisioned in our invention is a novel sweep-barrier element which may be used in conjunction with nests of the above type having associated therewith egg collecting belts, the path of travel of which is closely spaced from the front of the nest and normal to the transverse axis of the nest, and a further object of our invention is a combination sweep-barrier element which acts as a shield or cover for the egg collection belt when the device is in a horizontally disposed position immediately overlying the floor of the nest.

A still further object of our invention is the provision of a device of the class immediately above described which sweeps any live or dead hens from the nest and deposits them exteriorly of the egg collection belt and without entanglement therewith.

A further object of our invention is the provision of a combination sweep-barrier element which is so designed as to permit free passage at all times of eggs within the nest to the egg collection belt under gravity and without damage to said eggs.

A further object of our invention is the provision of a mechanism of the type generally above described which incorporates a minimum of working parts and which is highly rugged, durable and efficient in its operation.

A further object of our invention is the provision of a device of the class described which may be manufactured and maintained at a minimum of expense and labor.

A still further object of our invention is the provision of a device of the class described which is cleaner and more sanitary than any device heretofore produced and which will consequently produce cleaner and more sanitory eggs.

The above and still further objects of our invention will become apparent from the following detailed specification, appended claims and attached drawings.

Referring to the drawings wherein like characters indicate like parts throughout the several views.

FIG. 1 is a view in front elevation of a conventional multiple nesting device constructed in accordance with our invention;

FIG. 2 is a view in top plan, portions thereof being broken away;

FIG. 3 is a view in transverse section as seen from the line 3—3 of FIG. 2, portions thereof being shown in elevation; and FIG. 4 is a greatly enlarged view in transverse section as seen substantially from the line 4—4 of FIG. 2.

Referring with greater particularity to the drawings, the numeral 1 indicates in its entirety a housing formed to provide a nesting chamber 2, the side walls of which are identified by 3, the rear wall by 4, the bottom by 5, and the top by 6.

The open front 7 jointly defined by the wall elements 3, 4, 5 and 6 is normally provided with a depending fabric curtain 8 which, as shown particularly in FIG. 1, is provided with longitudinally spaced slits 9 which separate the curtain 8 into a plurality of curtain sections 8a. It will be noted that the bottom 5, which is in the nature of a screen, slants forwardly from the rear wall 4 to the open front 7 whereby to cause any eggs $a$ deposited thereon to roll, under the action of gravity, out of the open front 7 and onto a conveyor belt identified in its entirety by 10. It will be noted that the belt 10 is spaced immediately forwardly of the open front 7 and that the path of travel thereof is parallel to the longitudinal axis of the housing 1.

Shown as being pivotally secured on a horizontal axis 11, forwardly of the egg collection belt 10, is a cross-sectionally angular hood-like cover member 12, the vertical leg portion of which is identified by 13, and the horizontal leg by 14. It will be noted that it is the vertical leg that is pivotally secured, as at 11, whereas the horizontal leg overlies and protects the conveyor belt 10 when said parts are in the full line position of FIG. 4. It will be noted that the rearwardly projected edge of the leg 14 forms a means 15 for securing together, for common movement about the axis 11, a plurality of tines 16 which are laterally spaced with respect to each other and which extend into and substantially completely overlie the bottom 5. As shown by FIG. 2, the tines 16 are spaced apart sufficiently to permit passage therebetween with cease of the eggs $a$. However, this spacing between the tines 16 is totally inadequate to permit passage therebetween of a live or dead chicken B. As shown, elements 12 and 16 cooperate to define a combination sweep-barrier element identified in its entirety by 17.

Referring again to FIG. 4, it will be noted that the forward end portions of the tines 16 are arcuate and that the connecting means 15 is so vertically spaced with respect to the immediately underlying portion of the bottom 5 as to define a passage $c$ through which eggs $a$ may pass to the conveyor belt 10 at all times.

Referring again to FIG. 4, the full lines indicate the position which the sweep-barrier element 17 is caused to assume when it is desired to permit chickens B to enter the open front 7 through the curtain sections 8a, and during the predetermined laying periods. The sweep-barrier element is of such thickness to permit the hen B to lay the eggs $a$ directly upon the bottom 5. At the termination of the preset laying period the sweep-barrier element 17 is pivotally swung about the axis 11 to the broken line showing thereof wherein the tines 16 are angularly inclined adjacent the open front 7. During this movement not only are the live chickens B within the chamber 2 ejected through the open front 7 (by displacement of the curtain 8) but also any dead chickens B which may be found therein. During such removal of live and dead chickens the eggs $a$ are not damaged in view of the spacing between the tines 16 and, consequently, they will roll under the action of gravity down the bottom 5 onto the conveyor belt 10. Obviously, any dead chickens B which would be ejected from the nest by the sweep-barrier element 17 would slide down the tines 16 and the then inclined leg portion 14 and be deposited laterally forwardly with respect to the belt 10 and without coming into contact therewith. Obviously, while the tines 16 are in the inclined, broken line position of FIG. 4, they constitute a barrier to the entrance of any chicken to the chamber 2.

As shown, we provide power means for swinging the sweep-barrier element 17 from its full to broken line positions of FIG. 4. Preferably this is accomplished through the medium of a pair of fluid pressure operated cylinders 18 which are suitably secured to the end walls 3 of the housing 1 exteriorly of the chamber 2. Specifically, the rear end portions of the cylinders 18 are pivotally secured to suitable bracket means 19, as indicated at 20, whereas the forward end of a piston-equipped rod 21 are pivotally secured at their forward ends, as indicated at 22, to upstanding brackets 23 carried by the cover member 12. Under this arrangement when fluid under pressure is introduced into the rear end of a cylinder through conduit means 24, the sweep-barrier element 17 is moved from the full to the broken line positions of FIG. 4. When the fluid pressure is allowed to escape from the cylinder the sweep-barrier element 17 is returned to the full line position through the medium of a coil tension spring 25.

Our invention has been thoroughly tested and found to be completely satisfactory for the accomplishment of the above objects, and while we have shown a preferred embodiment thereof, we wish it to be understood that same may be capable of modification without departure from the scope and spirit of the appended claims.

What is claimed is:

1. In a poultry nest having side and rear closure means and a nest-forming bottom which jointly define a nesting chamber having an open front,
   (a) a combination sweep-barrier element,
   (b) means pivotally mounting the forward end portion of said element for pivotal swinging movements of said element from a generally horizontal position wherein a portion thereof closely overlies said bottom to a generally upright tilted position adjacent said open front wherein it constitutes a barrier to said chamber,
   (c) said sweep-barrier element having aperture means therein which readily permits passage of poultry eggs therethrough but which definitely prevents passage therethrough of egg laying poultry.

2. The structure defined in claim 1 in which said sweepbarrier element comprises a plurality of laterally spaced tines.

3. The structure defined in claim 2 in further combination with means connecting the front end portions of said tines together for common movement, said last-mentioned means being spaced vertically from the underlying portion of said bottom and defining with said bottom a passageway for eggs from said chamber.

4. The structure defined in claim 3 in which said bottom tilts forwardly whereby to cause eggs to pass through said passageway under gravity, and in further combination with an egg collection belt forwardly of said open front and receiving eggs from said passageway, said sweep-barirer element forwardly of said nest defining a cover member which overlies and protects said collection belt when said sweep-barrier element is in overlying relationship to said bottom.

5. The structure defined in claim 4 in which said cover member is in the nature of a hood having a depending leg which is forwardly disposed with respect to said egg collection belt, said means pivotally mounting said sweep-barrier element for swinging movements being associated with the lower end of said leg.

References Cited in the file of this patent

UNITED STATES PATENTS

| | | |
|---|---|---|
| 2,564,207 | Marshall | Aug. 14, 1951 |
| 2,694,381 | Kaegebein | Nov. 16, 1954 |
| 2,695,006 | Tellefson | Nov. 23, 1954 |
| 3,027,871 | Peterson | Apr. 3, 1962 |